United States Patent
Kim et al.

(10) Patent No.: US 8,134,957 B2
(45) Date of Patent: Mar. 13, 2012

(54) METHOD FOR CONTROLLING SIGNAL POWER LEVEL TO CONTROL CONTENTION BEWEEN MOBILE TERMINALS, AND SIGNAL POWER LEVEL CONTROLLER IN ORTHOGONAL FREQUENCY DIVISION MULTIPLEXING SYSTEM

(75) Inventors: Hyung-Jin Kim, Daejeon (KR); Seong-Chul Cho, Daejeon (KR); Gweon-Do Jo, Daejeon (KR); Jin-Up Kim, Daejeon (KR); Dae-Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 904 days.

(21) Appl. No.: 12/086,251

(22) PCT Filed: Dec. 4, 2006

(86) PCT No.: PCT/KR2006/005175
§ 371 (c)(1),
(2), (4) Date: Jun. 9, 2008

(87) PCT Pub. No.: WO2007/066938
PCT Pub. Date: Jun. 14, 2007

(65) Prior Publication Data
US 2009/0168705 A1 Jul. 2, 2009

(30) Foreign Application Priority Data

Dec. 8, 2005 (KR) .................. 10-2005-0119891
May 26, 2006 (KR) .................. 10-2006-0047338

(51) Int. Cl.
*H04W 4/00* (2009.01)
(52) U.S. Cl. .................. 370/328; 370/465; 455/522
(58) Field of Classification Search .............. 370/204, 370/206–208, 328–329, 342–343, 345, 441–442, 370/465; 455/127.1, 522
See application file for complete search history.

(56) References Cited

U.S. PATENT DOCUMENTS
0,141,349 A1  10/2002  Kim et al.
(Continued)

FOREIGN PATENT DOCUMENTS
JP       2002-320326       10/2002
(Continued)

OTHER PUBLICATIONS

Myonghee Park, et al., "Performance Analysis of OFDMA Uplink Syustems with Syumbol Timing Misalignment," IEEE Communications Letter, vol. 7, No. 8, Aug. 2003.

(Continued)

*Primary Examiner* — Kevin Mew
(74) *Attorney, Agent, or Firm* — Staas & Halsey LLP

(57) ABSTRACT

The present invention relates to a device for controlling a power level to control contention between mobile terminals in an uplink contention period in an orthogonal frequency division multiplexing access (OFDMA) system, and a method thereof. In the method, cell broadcasting information broadcasted from the base station is received by the mobile terminal, the transmission power information of the base station is obtained from the cell broadcasting information by the mobile terminal, a received power level of the received cell broadcasting information is obtained by the mobile terminal, transmission power of a signal transmitted to the base station is determined based on the transmission power information and the received power level, and the signal is transmitted to a contention period based on the determined transmission power.

7 Claims, 6 Drawing Sheets

U.S. PATENT DOCUMENTS

| | | | |
|---|---|---|---|
| 6,469,991 B1 * | 10/2002 | Chuah | 370/329 |
| 6,628,956 B2 | 9/2003 | Bark et al. | |
| 0,219,943 A1 | 11/2004 | Terry et al. | |
| 7,047,009 B2 * | 5/2006 | Laroia et al. | 455/437 |
| 7,310,303 B2 | 12/2007 | Koo et al. | |
| 7,324,484 B2 | 1/2008 | Bae et al. | |
| 7,330,457 B2 * | 2/2008 | Panwar et al. | 370/338 |
| 7,583,625 B2 * | 9/2009 | Bennett | 370/313 |
| 7,720,502 B2 * | 5/2010 | Suga et al. | 455/522 |
| 2004/0062192 A1 | 4/2004 | Liu et al. | |
| 2005/0030931 A1 * | 2/2005 | Sung et al. | 370/342 |
| 2005/0041573 A1 * | 2/2005 | Eom et al. | 370/208 |
| 2005/0058151 A1 * | 3/2005 | Yeh | 370/445 |
| 2005/0105589 A1 | 5/2005 | Sung et al. | |
| 2005/0250528 A1 * | 11/2005 | Song et al. | 455/522 |
| 2007/0109995 A1 * | 5/2007 | Quigley et al. | 370/329 |
| 2010/0124194 A1 * | 5/2010 | Chun et al. | 370/329 |
| 2011/0085611 A1 * | 4/2011 | Laroia et al. | 375/260 |

FOREIGN PATENT DOCUMENTS

| | | |
|---|---|---|
| KR | 2001-0113744 | 12/2001 |
| KR | 2002-0066590 | 8/2002 |
| KR | 2003-0035969 | 5/2003 |
| KR | 2003-0058589 | 7/2003 |
| KR | 10-0399014 | 9/2003 |
| KR | 2003-0084243 | 11/2003 |
| KR | 2005-0091098 | 9/2005 |
| WO | 02/33848 A1 | 4/2002 |
| WO | 02/078232 A1 | 10/2002 |

OTHER PUBLICATIONS

International Search Report and the Written Opinion of the International Searching Authority Mar. 18, 2009 and issued in corresponding International Patent Application PCT/KR2006/005175.

* cited by examiner

METHOD FOR CONTROLLING SIGNAL POWER LEVEL TO CONTROL CONTENTION BEWEEN MOBILE TERMINALS, AND SIGNAL POWER LEVEL CONTROLLER IN ORTHOGONAL FREQUENCY DIVISION MULTIPLEXING SYSTEM

CROSS REFERENCE TO RELATED APPLICATIONS

This application claims the benefit under 35 U.S.C. Section 371, of PCT International Application Number PCT/KR2006/005175, filed Dec. 4, 2006 and Korean Applications Nos. 10-2005-00119891 and 10-2006-0047338, filed Dec. 8, 2005 and May 26, 2006, respectively, in Korea, the contents of all of which are incorporated herein by reference.

TECHNICAL FIELD

The present invention relates to contention between mobile terminals in an orthogonal frequency division multiplexing access (OFDMA) system, and more particularly, to a device for controlling a power level to control the contention between the mobile terminals in an uplink contention period, and a method thereof.

BACKGROUND ART

In general, when a mobile terminal performs an initial access in an orthogonal frequency division multiplexing access (OFDMA) system, the base station does not allow a predetermined mobile terminal to perform the initial access to the base station in a predetermined process, but a plurality of mobile terminals compete with each other to perform the initial access to the base station. In this case, when two or more mobile terminals perform the initial access to the base station at the same time, all the mobile terminals fail to perform the initial access.

To solve the above problem, a method for allocating more resources to the contention period has been suggested. However, since the resources allocated to the contention period are allocated to transmit user data, the resources are greatly consumed when the user data are transmitted.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for reducing a contention rate of a contention period without consuming resources for data transmission.

In addition, the present invention has been made in an effort to provide a signal power level controller for controlling power of a signal transmitted from a mobile terminal.

Technical Solution

In an exemplary signal power level controlling method of a mobile terminal accessed to a base station in an orthogonal frequency division multiplexing access system: a) cell broadcasting information broadcasted from the base station is received by the mobile terminal (here, the cell broadcasting information includes transmission power information); b) the transmission power information of the base station is obtained from the cell broadcasting information by the mobile terminal; c) a received power level of the received cell broadcasting information is obtained by the mobile terminal; and d) transmission power of a signal transmitted to the base station is determined based on the transmission power information and the received power level, and the signal is transmitted to a contention period based on the determined transmission power.

An exemplary signal power level controller of a mobile terminal accessed to a base station in an orthogonal frequency division multiplexing access system according to an embodiment of the present invention includes a received power obtaining unit, a transmission power information obtaining unit, and a transmission power determining unit. The received power obtaining unit obtains a received power level of received cell broadcasting information when the base station receives the cell broadcasting information from the mobile terminal. The transmission power information obtaining unit obtains base station transmission power information included in the cell broadcasting information (here, the transmission power information is power information of the cell broadcasting information when the cell broadcasting information is transmitted from the base station to the mobile terminal). The transmission power determining unit determines a power level applied to transmit a signal from the mobile terminal to the base station, based on the obtained received power level and the base station transmission power information.

Advantageous Effects

According to the exemplary embodiment of the present invention, since the transmission power level of the signal transmitted from the mobile terminal to the base station is controlled, the contention rate may be reduced without allocating additional uplink resources when the plurality of mobile terminals compete with each other.

In addition, since the uplink resources are not additionally allocated, the resources may be efficiently used.

BEST MODE

Figure 1:
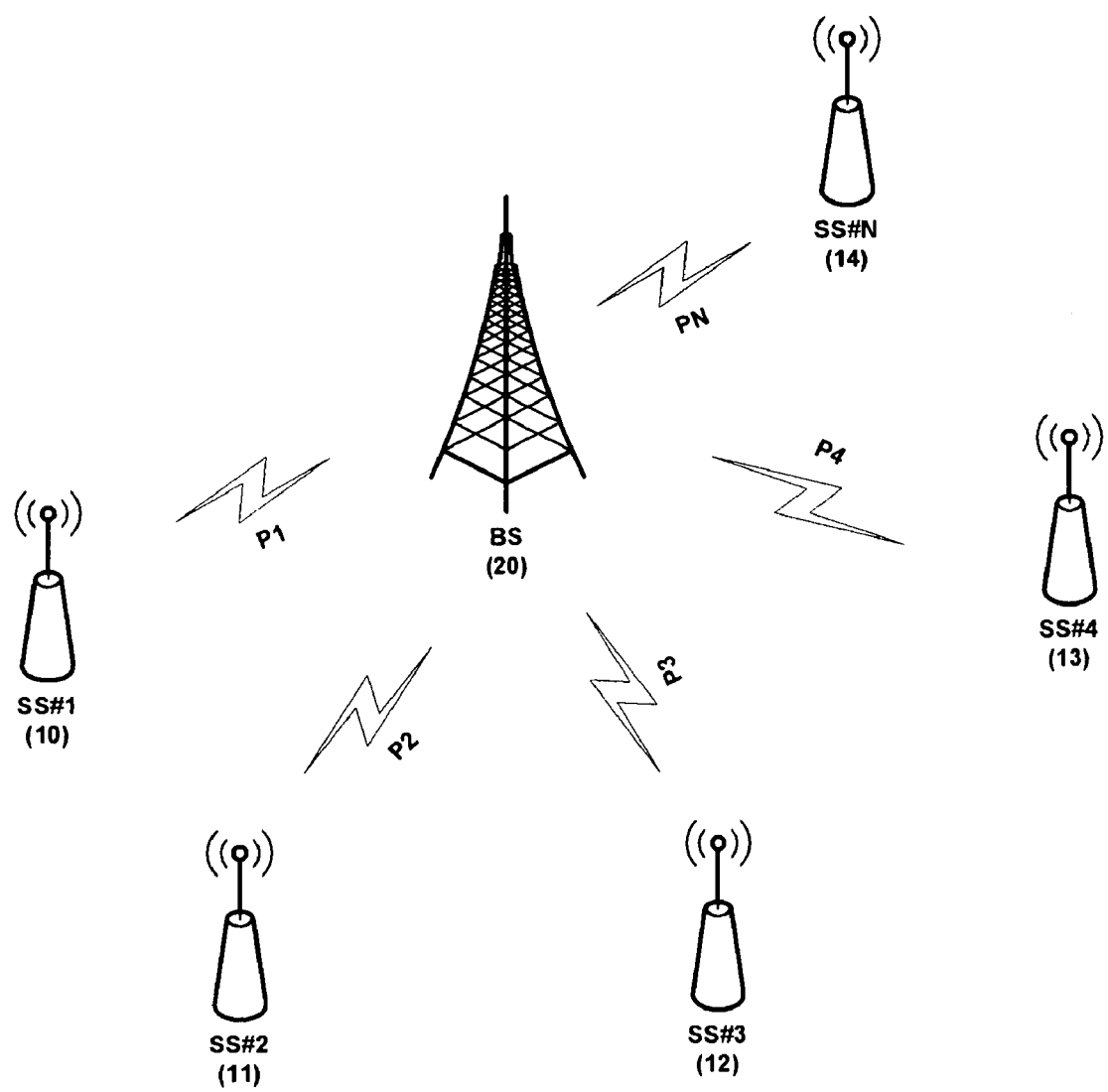
FIG. 1 schematically shows a diagram of a conventional orthogonal frequency division multiplexing access (OFDMA) system FIG. 2 schematically shows a configuration of a data frame of the conventional OFDM system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Unless explicitly described to the contrary, the word "comprise" and variations such as "comprises" or "comprising" will be understood to imply the inclusion of stated elements but not the exclusion of any other elements.

FIG. 1 schematically shows a diagram of a conventional orthogonal frequency division multiplexing access (OFDMA) system.

As shown in FIG. 1, N mobile terminals 10 to 15 respectively having wireless transmitting/receiving functions communicate with a base station 20 through a radio channel. Here, the N mobile terminals 10 to 15 are positioned in various places within a predetermined cell of the base station 20.

In this case, the base station 20 adds transmission power of a base station signal to cell information to be broadcasted, and broadcasts the cell information. The N mobile terminals 10 to 15 receiving the cell information calculate a difference between the transmission power included in the received cell information and power of the base station signal received by the mobile terminals 10 to 15, so that the mobile terminals 10 to 15 may determine an attenuation rate of the transmitted base station signal when the base station signal is transmitted. In this case, the attenuation rate is used to estimate a distance between the base station 20 and the mobile terminals 10 to 15.

A configuration of a data frame transmitted from the mobile terminals 10 to 15 to the base station 20 will be described with reference to FIG. 2.

Figure 2:
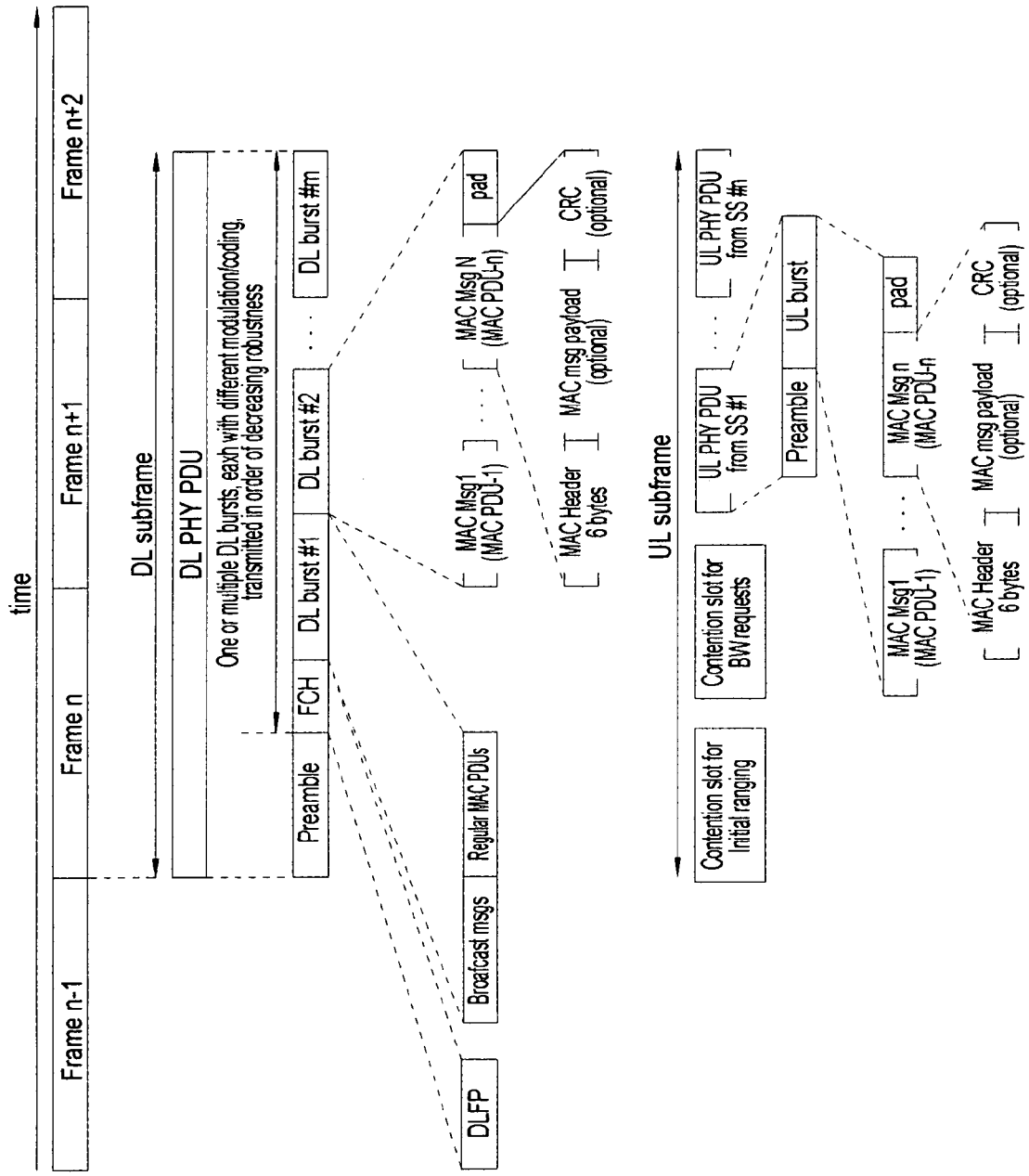

FIG. 2 schematically shows a configuration of a data frame of the conventional OFDM system.

There are two methods for transmitting a signal from a mobile terminal to the base station 20 to perform an initial access or to transmit data. In one of the two methods, mobile terminals compete with each other. In the other of the two methods, only one mobile terminal receives resources from the base station 20 and transmits a signal for the initial access.

In the frame configuration shown in FIG. 2, a contention slot for initial ranging and a contention slot for bandwidth (BW) requests in an uplink subframe are periods in which the mobile terminals compete with each other. An uplink (UL) physical (PHY) protocol data unit (PDU) is a period in which one mobile terminal receives resources from the base station and transmits a signal.

In further detail, in a like manner of a conventional wireless system, when power of the mobile terminal is turned on in the OFDM system, the mobile terminal receives the cell information from a base station positioned in a cell including the mobile terminal, and registers the mobile terminal in the base station. Since the cell information of the base station is transmitted from the base station to the mobile terminal through a method that is previously defined in the OFDM system, the mobile terminal receives and collects the cell information broadcasted from the base station.

The cell information includes information on a period for performing a ranging operation for performing initial access to the base station. In the contention slot for initial ranging in the uplink subframe shown in FIG. 2, the ranging operation is performed so that respective pieces of information transmitted from the plurality of mobile terminals performing the initial access may not collide with each other.

To perform the initial access in the OFDM system, the base station does not allow a predetermined mobile terminal to perform the initial access, but the plurality of mobile terminals compete with each other. The mobile terminal may successfully perform the initial access when only one mobile terminal tries to gain access to the base station, but all the mobile terminals fail to perform the initial access when two or more mobile terminals simultaneously try to perform the initial access. The mobile terminal that has failed to perform the initial access tries to perform the initial access again in a predetermined time.

When the mobile terminal successfully performs the initial access to the base station in the above process, the mobile terminal requests uplink resources from the base station by using a contention slot period for a base station request, to transmit information on the mobile terminal. When the mobile terminals do not receive the uplink resources from the base station in the contention slot period when requesting the uplink resources, the mobile terminals requests the uplink resources in a predetermined time in a like manner of the initial access.

A method for transmitting a signal to a base station by two mobile terminals that are positioned in respective places will be described with reference to FIG. 3.

Figure 3:
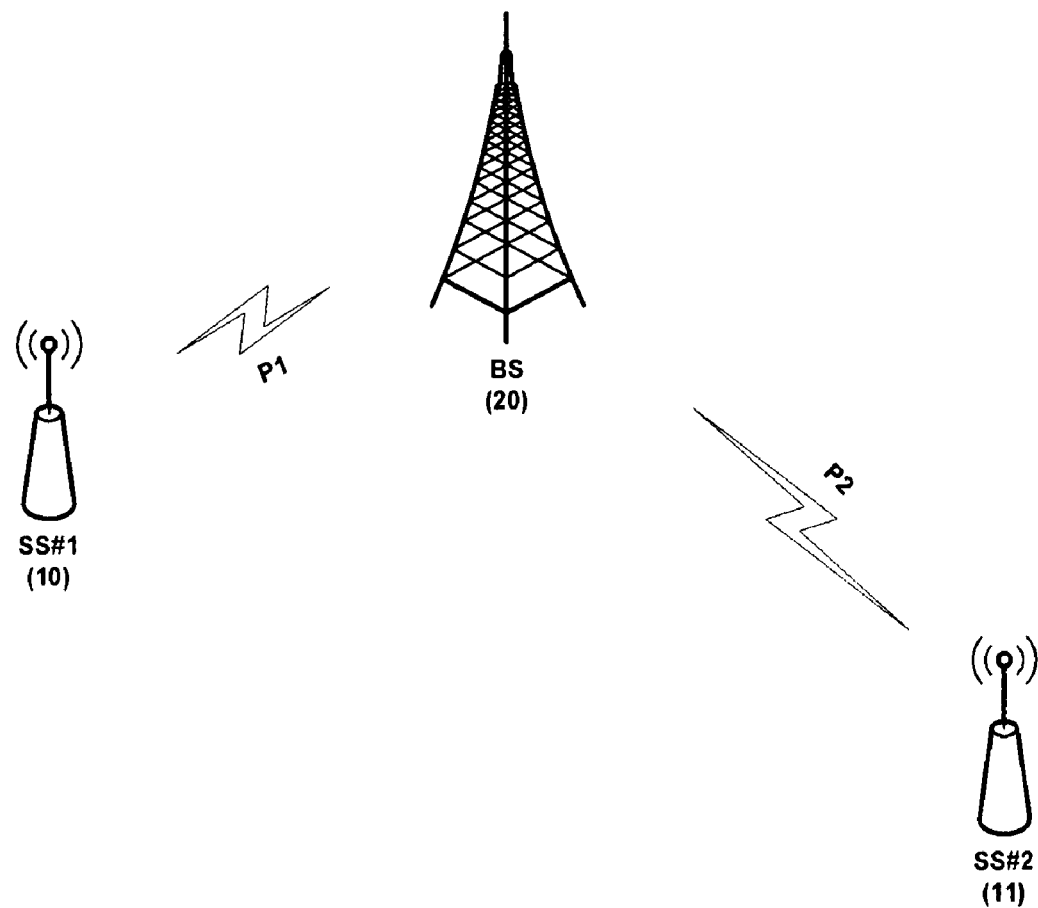
FIG. 3 shows a diagram representing two terminals transmitting signals to a base station from different places in the conventional OFDM system.

FIG. 3 shows a diagram representing two terminals transmitting signals to a base station from different places in the conventional OFDM system.

The respective mobile terminals 10 and 11 shown in FIG. 3 may determine an attenuation rate of a base station signal by using a difference between signal transmission power of the base station 20 and received power of the base station signal. That is, the mobile terminals 10 and 11 may estimate a distance between the mobile terminals 10 and 11 and the base station by using a difference between information on the power transmitted from the base station 20 and information on the power of the base station signal received in the mobile terminals 10 and 11.

Accordingly, the mobile terminals 10 and 11 may estimate how strongly the base station 20 receives a signal transmitted by the mobile terminals 10 and 11. In this case, when the mobile terminals 10 and 11 control signal transmission power, the mobile terminals 10 and 11 select a predetermined power value from among a threshold value for detecting a signal of the mobile terminals 10 and 11 by the base station 20 and a maximum transmission power value of the mobile terminals 10 and 11, and transmit the signal.

A signal to noise ratio (SNR) according to the power of the signal transmitted from the mobile terminal to the base station will be described with reference to FIG. 4.

Figure 4:
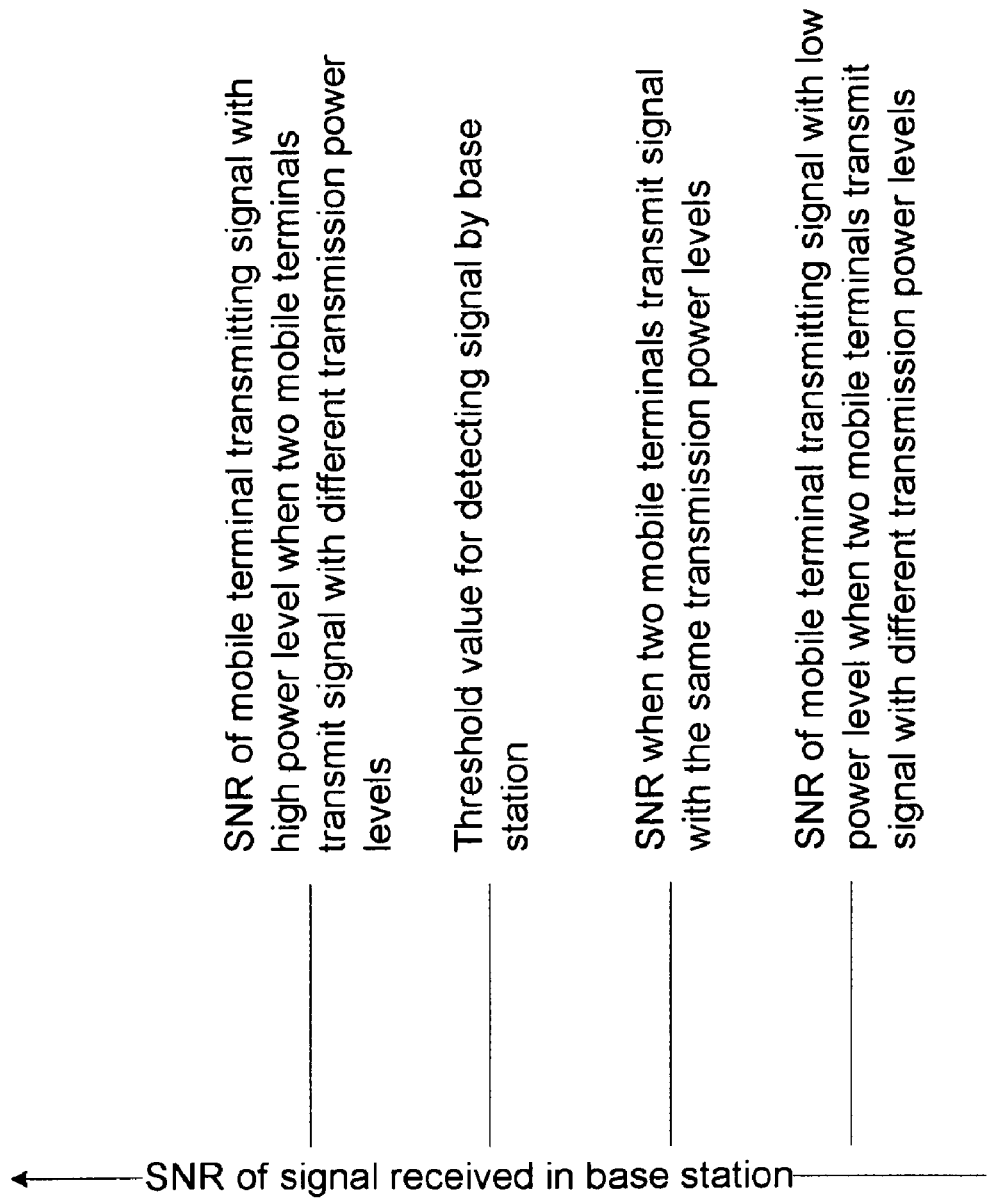
FIG. 4 shows a graph representing a signal to noise ratio (SNR) of the signal received by the base station according to signal power values transmitted for contention by the mobile terminals according to the exemplary embodiment of the present invention.

FIG. 4 shows a graph representing a SNR of the signal received by the base station according to signal power values transmitted for contention by the mobile terminals according to the exemplary embodiment of the present invention.

As shown in FIG. 4, a Y axis of the graph shows the SNR based on a threshold value when the base station may detect the signal or may not detect the signal. For example, while assuming that two mobile terminals transmit signals with the same power, since the SNRs of the two signals are lower than the threshold value for detecting the signal by the base station, the base station may not receive the signal transmitted from the two mobile terminals.

When power values of the signals transmitted from the two mobile terminals are different from each other, the base station may not detect the signal transmitted with a lower power value since the SNR of the signal with the lower power value is lower than the threshold value. However, since the SNR of the signal transmitted with a higher power is higher than the threshold value, the base station may detect the signal. As described, since the base station detects a signal transmitted from one of the two mobile terminals, a contention rate of the total contention period may be reduced.

A device for controlling the contention between the mobile terminals by controlling the signal transmission power will be described with reference to FIG. 5.

Figure 5:
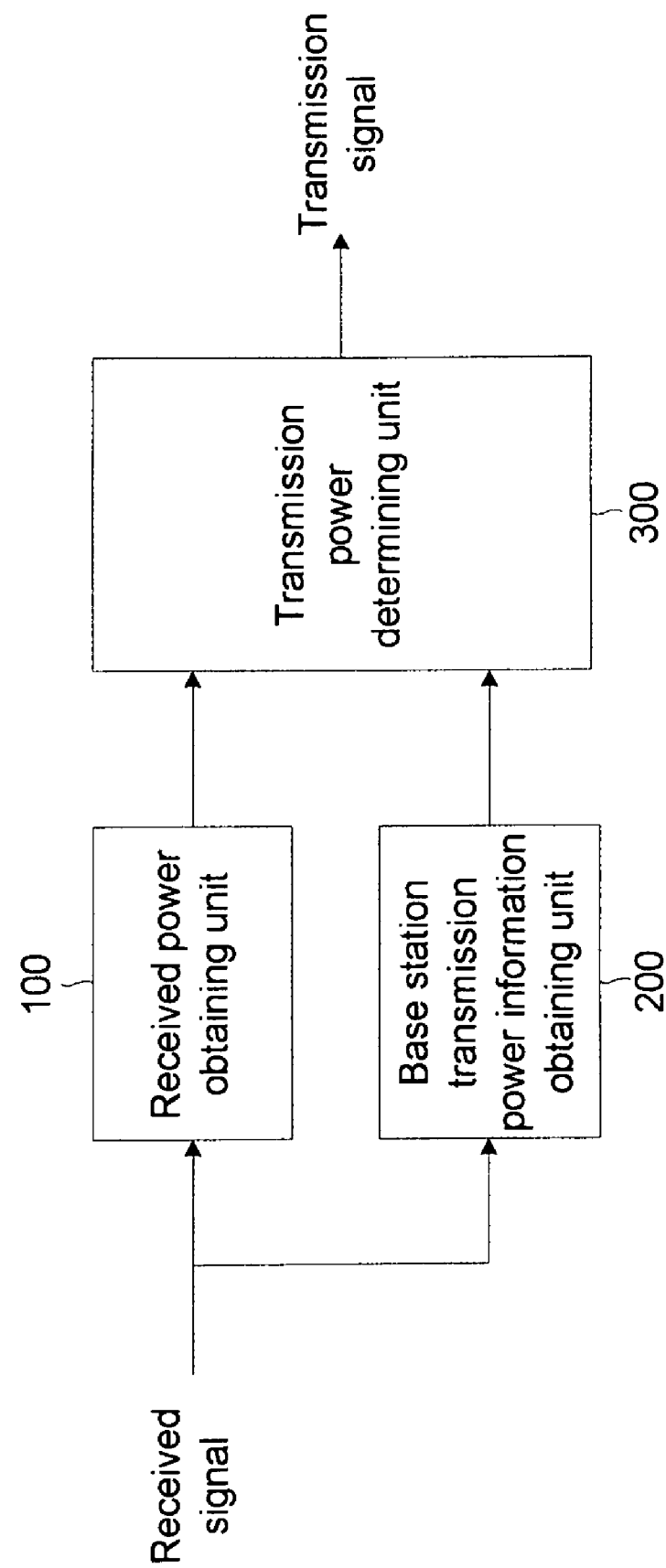
FIG. 5 shows a diagram of a configuration of a signal power level controller according to an exemplary embodiment of the present invention.

FIG. 5 shows a diagram of a configuration of a signal power level controller according to the exemplary embodiment of the present invention.

As shown in FIG. 5, the signal power level controller includes a received power obtaining unit 100, a base station transmission power information obtaining unit 200, and a transmission power determining unit 300, and it may be included in a transmitting unit (not shown) of the mobile terminal.

When the mobile terminal receives the cell broadcasting information broadcasted from the base station, the received power obtaining unit 100 obtains received power information of the moment the mobile terminal receives the cell broadcasting information. The mobile terminal may receive the cell broadcasting information with various received power values that vary according to the distance between the base station and the mobile terminal.

The base station transmission power information obtaining unit 200 obtains base station transmission power information from the cell broadcasting information. That is, the base station adds the base station transmission power information to the cell broadcasting information when the base station broadcasts the cell broadcasting information, and the base station transmission power information obtaining unit 200 obtains the base station transmission power information from the cell broadcasting information.

The transmission power determining unit 300 determines transmission power that is applied to transmit a signal from the mobile terminal to the base station, based on the received power obtained by the received power obtaining unit 100 and the base station transmission power information. The mobile terminal transmits the signal to the base station in the contention period based on the transmission power determined by the transmission power determining unit 300, and the base station detects a signal having a great power level from the plurality of received signals.

Here, the transmission power determining unit 300 may randomly select a transmission power value. When the mobile terminal sets an initial transmission power level to be low when transmitting a signal to the base station, the mobile terminal may continuously use the set initial transmission power.

When the mobile terminal sets the initial transmission power level to be higher than a minimum threshold value for receiving the signal by the base station, the mobile terminal increases a subsequent transmission power level.

When a difference between the base station transmission power and the received power of the mobile terminal is higher than a predetermined reference value, the mobile terminal may set the transmission power to be high. As described, the transmission power level is randomly determined by various simulations of the mobile terminal, but it is not limited thereto.

A method for controlling a power level by the power level controller will be described with reference to FIG. 6.

Figure 6:
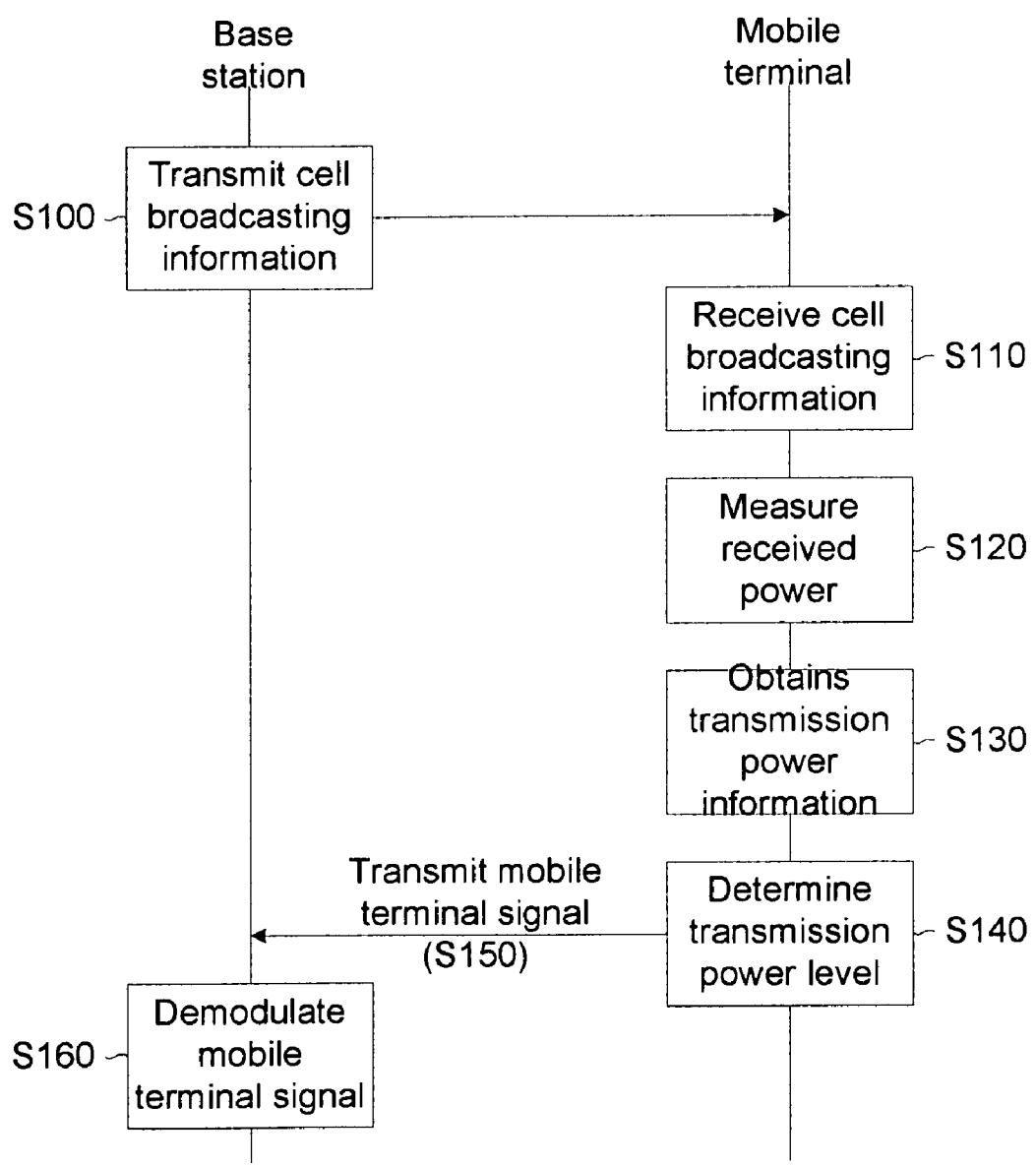
FIG. 6 shows a flowchart representing a method for controlling the contention between the mobile terminals by using a method for controlling a power level according to the exemplary embodiment of the present invention.

FIG. 6 shows a flowchart representing a method for controlling the contentions between the mobile terminals by using the method for controlling the power level according to the exemplary embodiment of the present invention.

As shown in FIG. 6, the base station transmits the cell broadcasting information to the mobile terminal in step S100. In this case, the cell broadcasting information includes power information on the power level of the signal transmitted from the base station to the mobile terminal.

The received power obtaining unit 100 of the mobile terminal receiving the cell broadcasting information measures the received power of the received cell broadcasting information in step S120. In addition, the base station transmission power information obtaining unit 200 obtains the transmission power information included in the cell broadcasting information in step S130.

The signal attenuation rate between the base station and the mobile terminal is calculated by using the base station transmission power in the cell broadcasting information and the received power of the base station signal received by the mobile terminal. The signal attenuation rate indicates a distance between the mobile terminal and the base station.

The mobile terminal calculating the signal attenuation rate determines a transmission power level in step S140. In this case, the transmission power level is higher than a threshold value corresponding to minimum power for detecting a signal by the base station. After determining the transmission power level, the mobile terminal transmits the signal to the contention period based on the determined power level in step S150. The base station demodulates the signal received from the mobile terminal in step S160.

To describe the transmission power determination in further detail, the base station cell broadcasting information includes the base station transmission power information. When the mobile terminal receives the cell broadcasting information from the base station, the received power obtaining unit 100 of the mobile terminal may obtain the received power of the signal received by the mobile terminal. In addition, the mobile terminal obtains the base station transmission power information in the cell broadcasting information by the base station transmission power information obtaining unit 200.

The mobile terminal may detect the signal attenuation rate based on the base station transmission power information and the received power, and the signal attenuation rate is calculated by subtracting the received power level from the base station transmission power level. Subsequently, the transmission power determining unit 300 determines the transmission power required to transmit the signal to the base station.

When the power level of the signal received in the base station is set to be high, transmission power E of the mobile terminal may be determined by adding the power level of the mobile terminal signal to the difference between the base station transmission power and the received power. That is, when the mobile terminal transmits the signal to the base station with the transmission power E, the transmission power is attenuated by the difference between the base station transmission power and the received power, and therefore the base station receives the signal power corresponding to the signal power of the mobile terminal.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A signal power level controlling method of a mobile terminal accessed to a base station in an orthogonal frequency division multiplexing access system, the signal power level controlling method comprising:
    a) the mobile terminal receiving cell broadcasting information from the base station wherein the cell broadcasting information includes transmission power information;
    b) the mobile terminal obtaining the transmission power information of the base station from the cell broadcasting information;
    c) the mobile terminal obtaining a received power level of the received cell broadcasting information; and
    d) determining transmission power of a signal to be transmitted to the base station based on the transmission power information and the received power level, and transmitting the signal to the base station in a contention period based on the determined transmission power.

2. The signal power level controlling method of claim 1, further comprising, after c), d) receiving a signal having the greatest signal power level among a plurality of received mobile terminal signals in the contention period.

3. The signal power level controlling method of claim 2, wherein, in d), the signal having the greatest signal power level among the plurality of mobile terminal signals has a signal to noise ratio (SNR) that is higher than that of a signal having a low signal power level.

4. The signal power level controlling method of claim 1, wherein, in d), a level of the transmission power of the signal transmitted to the base station is randomly determined by the mobile terminal, and it is set to be higher than the lowest threshold value for receiving the signal by the base station.

5. The signal power level controlling method of claim 4, wherein the signal is transmitted from the mobile terminal to the base station with the transmission power obtained by adding the transmission power determined by the mobile terminal to a difference between the base station transmission power information and the received power level.

6. A mobile terminal accessed to a base station in an orthogonal frequency division multiplexing access system, the mobile terminal comprising:
    a signal power level controller device, the signal power level controller comprising:
    a received power obtaining unit for obtaining a received power level of received cell broadcasting information when the mobile terminal receives the cell broadcasting information from the base station;
    a transmission power information obtaining unit for obtaining base station transmission power information included in the cell broadcasting information wherein the transmission power information is power information of the cell broadcasting information when the cell broadcasting information is transmitted from the base station to the mobile terminal; and
    a transmission power determining unit for determining a power level applied to transmit a signal from the mobile terminal to the base station, based on the obtained received power level and the base station transmission power information.

7. The signal power level controller of claim 6, wherein the transmission power determining unit determines the transmission power by adding the transmission power of the signal to be transmitted from the mobile terminal to the base station to a difference between the base station transmission power and the received power level.

* * * * *